United States Patent
Proctor, Jr. et al.

(10) Patent No.: US 6,792,290 B2
(45) Date of Patent: Sep. 14, 2004

(54) METHOD AND APPARATUS FOR PERFORMING DIRECTIONAL RE-SCAN OF AN ADAPTIVE ANTENNA

(75) Inventors: James Arthur Proctor, Jr., Indialantic, FL (US); Lawrence Wayne La Mont, Jr., Melbourne, FL (US); George Rodney Nelson, Jr., Merritt Island, FL (US); Kenneth Marvin Gainey, Satellite Beach, FL (US)

(73) Assignee: IPR Licensing, Inc., Wilmington, DE (US)

(*) Notice: Subject to any disclaimer, the term of this patent is extended or adjusted under 35 U.S.C. 154(b) by 614 days.

(21) Appl. No.: 09/776,396

(22) Filed: Feb. 2, 2001

(65) Prior Publication Data

US 2001/0031648 A1 Oct. 18, 2001

Related U.S. Application Data

(63) Continuation-in-part of application No. 09/579,084, filed on May 25, 2000, which is a division of application No. 09/210,117, filed on Dec. 11, 1998, now Pat. No. 6,100,843, which is a continuation of application No. 09/157,736, filed on Sep. 21, 1998, now abandoned.

(51) Int. Cl.[7] ............................................. H04B 1/38
(52) U.S. Cl. ................. 455/562.1; 455/273; 455/276.1; 342/367; 342/373
(58) Field of Search ............................ 455/276.1, 273, 455/25, 562.1; 342/367–368, 371–373, 154

(56) References Cited

U.S. PATENT DOCUMENTS

| | | | |
|---|---|---|---|
| 5,617,102 A | | 4/1997 | Prater |
| 6,087,986 A | * | 7/2000 | Shoki et al. ................. 342/383 |
| 6,100,843 A | | 8/2000 | Proctor, Jr. et al. |
| 6,115,406 A | * | 9/2000 | Mesecher ................... 375/130 |
| 6,304,215 B1 | * | 10/2001 | Proctor et al. .............. 342/372 |
| 2001/0020915 A1 | * | 9/2001 | Proctor, Jr. ................. 342/372 |

\* cited by examiner

*Primary Examiner*—Lee Nguyen
(74) *Attorney, Agent, or Firm*—Allen, Dyer, Doppelt, Milbrath & Gilchrist, P.A.

(57) ABSTRACT

An antenna apparatus that can increase capacity in a cellular communication system. The antenna operates in conjunction with a mobile subscriber unit and provides a plurality of antenna elements, each coupled to a respective signal control component such as a phase shifter. The phase shift for each antenna element is programmed for optimum reception during, for example, an idle mode when a pilot signal is received. The antenna array creates a beam former for signals to be transmitted from the mobile subscriber unit, and a directional receiving array to more optimally detect and receive signals transmitted from the base station. By directionally receiving and transmitting signals, multipath fading is greatly reduced as well as intercell interference. The phase shifters are adjusted in a coarse and a fine mode. In the coarse mode all phase shifters are jointly incremented through several phase shift values until a signal quality metric is optimized. The coarse adjustment mode is followed by a fine adjustment mode during which the phase shifters are independently adjusted to further optimize the signal quality metric.

79 Claims, 8 Drawing Sheets

METHOD AND APPARATUS FOR PERFORMING DIRECTIONAL RE-SCAN OF AN ADAPTIVE ANTENNA

CROSS-REFERENCE TO RELATED APPLICATIONS

This application is a Continuation-In-Part of U.S. patent application Ser. No. 09/579,084 filed May 25, 2000 entitled "Adaptive Antenna For Use In Same Frequency Networks," which is a divisional application of U.S. patent application Ser. No. 09/210,117 filed on Dec. 11, 1998 now U.S. Pat. No. 6,100,843 entitled "Adaptive Antenna for use in Same Frequency Networks," which is a continuation application of U.S. patent application Ser. No. 09/157,736 filed Sep. 21, 1998 now abandoned entitled "Method and Apparatus Providing an Adaptive Antenna For Use in Same Frequency Networks," the entire teachings of which are incorporated herein by reference.

FIELD OF THE INVENTION

This invention relates to mobile (or portable) cellular communication systems, and more particularly to an antenna apparatus for use by mobile subscriber units to provide beam forming transmission and reception capabilities.

BACKGROUND OF THE INVENTION

Code division multiple access (CDMA) communication systems provide wireless communications between a base station and one or more mobile subscriber units. The base station is typically a computer-controlled set of transceivers that are connected to a land-based public switched telephone network (PSTN). The base station includes an antenna apparatus for sending forward link radio frequency signals to the mobile subscriber units. The base station antenna also receives reverse link radio frequency signals transmitted from each mobile unit. Each mobile subscriber unit also contains an antenna apparatus for the reception of the forward link signals and for transmission of the reverse links signals. A typical mobile subscriber unit is a digital cellular telephone handset or a personal computer coupled to a cellular modem. In CDMA cellular systems, multiple mobile subscriber units may transmit and receive signals on the same frequency, but with different modulation codes, to distinguish signals sent to or received from individual subscriber units.

The most common type of antenna for transmitting and receiving signals at a mobile subscriber unit is a monopole or omnidirectional antenna. This type of antenna consists of a single wire or antenna element that is coupled to a transceiver within the subscriber unit. The transceiver receives reverse link signals to be transmitted from circuitry within the subscriber unit and modulates the signals onto a carrier signal at a specific frequency assigned to that subscriber unit. The modulated carrier signal is then transmitted by the antenna element. Forward link signals received by the antenna element at a specific frequency are demodulated by the transceiver and supplied to processing circuitry within the subscriber unit.

The signal transmitted from a monopole antenna is omnidirectional in nature. That is, the signal is sent with substantially the same signal strength in all directions in a generally horizontal plane. Reception of a signal with a monopole antenna element is likewise omnidirectional. A monopole antenna does not differentiate in its ability to detect a signal in one azimuth direction versus detection of the same or a different signal coming from another azimuth direction. Generally, a monopole antenna does not produce significant radiation in the elevation direction. The antenna pattern is commonly referred to as a donut shape with the antenna element located at the center of the donut hole.

A second type of antenna that may be used by mobile subscriber units is described in U.S. Pat. No. 5,617,102. The system described therein provides a directional antenna comprising two antenna elements mounted on the outer case of a laptop computer, for example. The system includes a phase shifter attached to each element. The phase shifter may be switched on or off to effect the phase of signals transmitted or received during communications to and from the computer. By switching the phase shifters on and regulating the amount of phase shift imparted to the signals input thereto, the antenna pattern (which applies to both the receive and transmit modes) may be modified to provide a concentrated signal or beam in the selected direction. This is referred to as an increase in antenna gain or directionality. The dual element antenna of the cited patent thereby directs the transmitted signal into predetermined quadrants or directions to allow for changes in orientation of the subscriber unit relative to the base station, while minimizing signal loss due to the orientation change. In accordance with the antenna reciprocity theorem, the antenna receive characteristics are similarly effected by the use of the phase shifters.

CDMA cellular systems are also recognized as being interference limited systems. That is, as more mobile subscriber units become active in a cell and in adjacent cells, frequency interference becomes greater and error rates increase. As error rates increase, to maintain signal and system integrity, the operator must decrease the maximum data rates allowable to all users. In lieu of decreasing all user's data rates, the CDMA system operator can decrease the number of active mobile subscriber units, thus clearing the airwaves of potential interferers. For instance, to increase the maximum available data rate by a factor of two, the number of active mobile subscriber units is decreased by one half. However, this is rarely an effective mechanism to increase data rates because system users generally do not have priority assignments to be utilized in determining which users should be dropped from the system.

SUMMARY OF THE INVENTION

Problems of the Prior Art

Various problems are inherent in prior art antennas used on mobile subscriber units in wireless communications systems. One such problem is called multipath fading. In multipath fading, a radio frequency signal transmitted from a sender (either a base station or mobile subscriber unit) may encounter interference on route to the intended receiver. The signal may, for example, be reflected from objects, such as buildings, that are not in the direct transmission path, but that redirect a reflected version of the original signal to the receiver. In such instances, the receiver receives two versions of the same radio frequency signal; the original version and a reflected version. Each received signal is at the same frequency, but the reflected signal may be out of phase with the original due to the reflection and consequent longer transmission path. As a result, the original and reflected signals may partially cancel each other (destructive interference), resulting in fading or dropouts in the received signal; hence the term multipath fading.

Single element antennas are highly susceptible to multipath fading. A single element antenna has no way of determining the direction from which a transmitted signal is sent and cannot be tuned or attenuated to more accurately detect and receive a signal arriving from any particular direction. Its directional pattern is fixed by the physical structure of the antenna components.

The dual element antenna described in the aforementioned reference is also susceptible to multipath fading due to the symmetrical and opposing nature of the hemispherical lobes formed by the antenna pattern when the phase shifter is activated. Since the lobes created in the antenna pattern are more or less symmetrical and in opposing directions, a signal reflected so that it arrives at the reverse antenna lobe can be received with nearly as much power as the original signal that is received directly at the forward antenna lobe. That is, if the original signal reflects from an object beyond or behind the intended receiver (with respect to the sender) and reflects back to the intended receiver from the opposite direction as the directly received signal, a phase difference in the two signals can create destructive interference due to multipath fading.

Another problem present in cellular communication systems is inter-cell interference. Most cellular systems are divided into individual cells, with each cell having a centrally-located base station. The placement of each base station is arranged such that neighboring base stations are located at approximately sixty degree intervals from each other. In essence, each cell may be viewed as a six sided polygon with a base station at the center. The edges of each cell adjoin each other and a group of cells form a honeycomb-like image if each cell edge were to be drawn as a line and all cells were viewed from above. The distance from the edge of a cell to its base station is typically driven by the maximum amount of power that is to be required to transmit an acceptable signal from a mobile subscriber unit located near the edge of the cell to that cell's base station (i.e., the power required to transmit an acceptable signal a distance equal to the radius of one cell).

Intercell interference occurs when a mobile subscriber unit near the edge of one cell transmits a signal that crosses over that edge into a neighboring cell and interferes with communications taking place within the neighboring cell. Typically, intercell interference occurs when the same or similar frequencies are used for communications in neighboring cells. The problem of intercell interference is compounded by the fact that subscriber units near the edges of a cell typically use higher transmit powers so that the signals they transmit can be effectively received by the intended base station located at the cell center. Consider that the signal from another mobile subscriber unit located beyond or behind the intended receiver may be arrive at the base station at the same power level, representing additional interference.

The intercell interference problem is exacerbated in CDMA systems, since the subscriber units in adjacent cells may typically be transmitting on the same frequency. For example, generally, two subscriber units in adjacent cells operating at the same carrier frequency but transmitting to different base stations will interfere with each other if both signals are received at one of the base stations. One signal appears as noise relative to the other. The degree of interference and the receiver's ability to detect and demodulate the intended signal is also influenced by the power level at which the subscriber units are operating. If one of the subscriber units is situated at the edge of a cell, it transmits at a higher power level, relative to other units within its cell and the adjacent cell, to reach the intended base station. But, its signal is also received by the unintended base station, i.e., the base station in the adjacent cell. Depending on the relative power level of two same-carrier frequency signals received at the unintended base station, it may not be able to properly identify a signal transmitted from within its cell from the signal transmitted from the adjacent cell. What is needed is a way to reduce the subscriber unit antenna's apparent field of view, which can have a marked effect on the operation of the forward link (base to subscriber) by reducing the apparent number of interfering transmissions received at a base station. A similar improvement is needed for the reverse link, so that the transmitted signal power needed to achieve a particular receive signal quality can be reduced.

BRIEF DESCRIPTION OF THE PRESENT INVENTION

The present invention provides an inexpensive antenna apparatus for use with a mobile subscriber unit in a wireless same-frequency communications system, such as a CDMA cellular communications system.

The invention provides an apparatus and method for efficiently configuring the antenna apparatus to maximize the effective radiated and/or received energy. The antenna apparatus includes multiple antenna elements and a like number of adjustable weight control components. As is well known in the art, the weight control components are controllable to adjust the phase, amplitude, phase and amplitude and/or delay of the signal coupled to each of the antenna elements. The weight control components (e.g., phase shifter, delay line, amplifier with variable gain) are jointly and independently operable to affect the direction of reverse link signals transmitted from the subscriber unit on each of the antenna elements and the receiving direction for forward link signals transmitted to the subscriber unit.

Further, the present invention provides an apparatus and method for initiating antenna angle re-scans during which the antenna is sequentially pointed in a plurality directions away from the primary direction so that the antenna directivity can be dynamically adjusted to compensate for changing radio frequency environments. It is advantageous to execute the re-scan process as pedestrian movement or other changes in the physical environment at the subscriber unit can modify the direction from which the best signal is received by the subscriber unit as transmitted by the base station (or vice versa). The antenna is therefore controlled to change its steered direction to achieve the optimum signal performance between the subscriber unit and the base station, It is further advantageous, according to the teachings of the present invention, to identify certain advantageous times for executing the re-scan process to minimize interruptions to the data transmission and minimize the loss of data packets, thereby maintaining optimum system performance.

Prior to execution of the re-scan process, the antenna has been pointed in a current or primary direction, for receiving or transmitting data, as determined by the setting of the weight control components. To determine whether another direction might offer an improvement in signal quality, the antenna is rescanned to one or more different directions (also referred to as scan angles) and one or more signal quality metrics of interest are measured at each of those scan angles. The signal quality metric at each of these scan angles is compared with the signal quality metric at the primary or current direction or scan angle to determine whether the current scan angle should be changed to another angle where an improvement in the signal quality metric can be attained. Thus, by controlling the weight control components, the antenna apparatus functions as a beam former for transmission of signals from the subscriber unit and as a directional antenna for signals received by the subscriber unit such that a particular signal quality metric of interest is optimized.

Through the use of an array of antenna elements and execution of the re-scan process, the antenna apparatus increases the effective transmit power per bit transmitted. Thus, the number of active subscriber units in a cell may remain the same while the antenna apparatus of this invention allows for an increase in data rates for each subscriber unit beyond those achievable by prior art antennas. Alternatively, if data rates are maintained at a given rate, more subscriber units may become active in a cell using the antenna apparatus described herein. In either case, the cell capacity increases, as measured by the sum total of data being communicated at any time.

In accordance with the teachings of the present invention, forward link communications capacity can be increased as well, due to the directional reception capabilities of the antenna as optimized during the re-scan process. Since a properly directed antenna is less susceptible to interference from adjacent cells, the forward link cell capacity can be increased by adding more users or by increasing cell radius.

With respect to the physical implementation of the antenna, one embodiment of the present invention specifies that first, second, and third antenna elements are positioned at locations corresponding to corners of an equilateral triangle and are aligned orthogonal to a plane defined by the triangle. Other embodiments specify that first, second, third and fourth antenna elements are positioned at locations corresponding to corners of a rectangle or square, with the fifth antenna element positioned at a location corresponding to approximately the center of thereof.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the figures. The drawings are not necessarily to scale, emphasis instead being placed upon illustrating the principles of the invention.

DETAILED DESCRIPTION OF THE PREFERRED EMBODIMENTS

Figure 1:
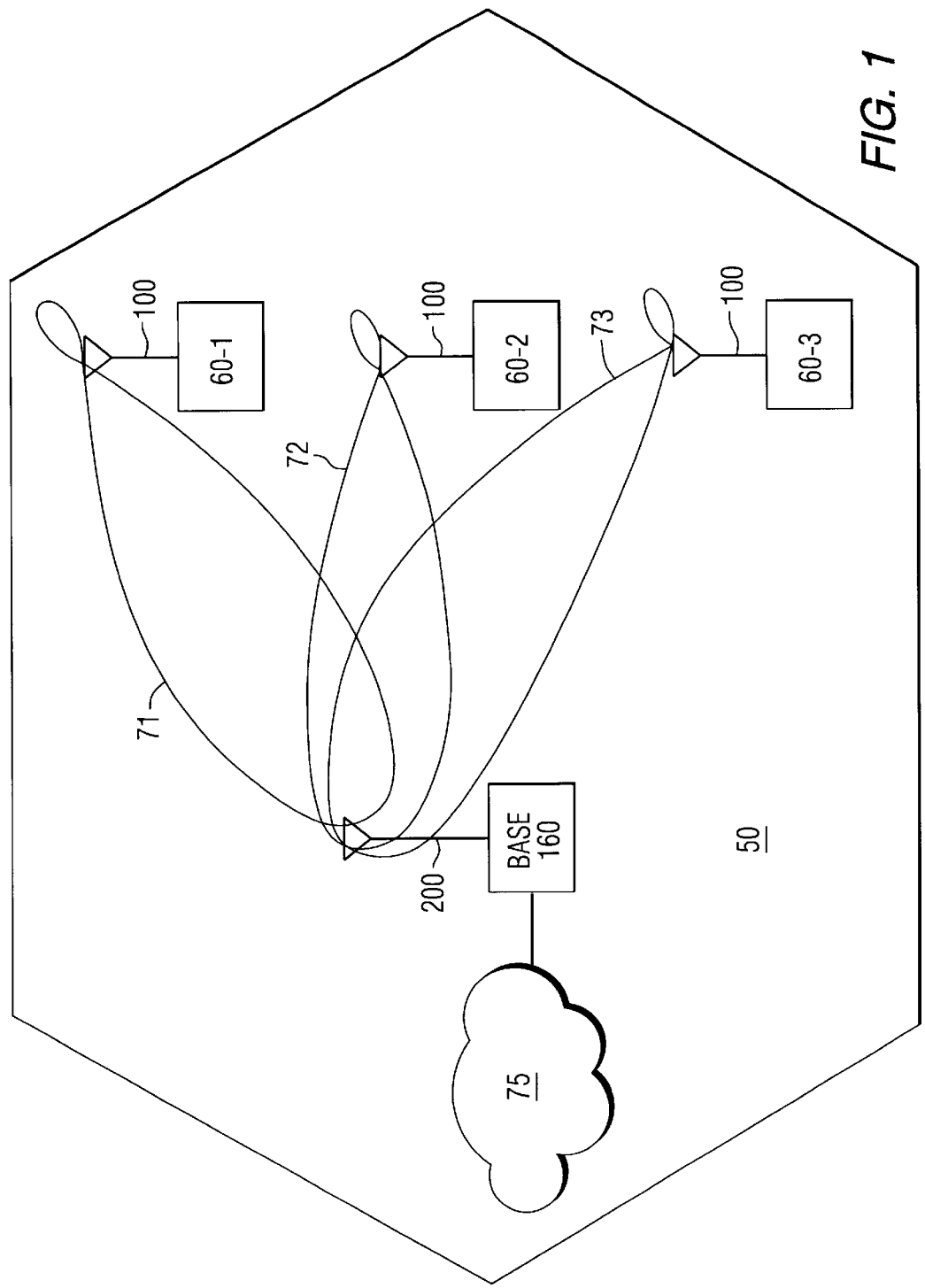
FIG. 1 illustrates a cell of a CDMA cellular communications system.

FIG. 1 illustrates one cell 50 of a typical CDMA cellular communication system. The cell 50 represents a geographical area in which mobile subscriber units 60-1 through 60-3 communicate with a centrally located base station 160. Each subscriber unit 60 is equipped with an antenna 100 configured according to the present invention. The subscriber units 60 are provided with wireless data and/or voice services by the system operator and can connect devices such as, for example, a laptop computer, a portable computer, a personal digital assistant (PDA) or the like through base station 160 to a network 75, which can be the public switched telephone network (PSTN), a packet switched computer network, such as the Internet, a public data network or a private network or intranet. The base station 160 communicates with the network 75 over any number of different available communications protocols such as primary rate ISDN, or other LAPD based protocols such as IS-634 or V5.2, or even TCP/IP if network 75 is a packet based Ethernet network such as the Internet. The subscriber units 60 may be mobile in nature and may travel from one location to another while communicating with the base station 160. As a subscriber unit leaves one cell and enters another, the communications link is handed off from the base station of the exiting cell to the base station of the entering cell. In another application the subscriber units may maintain a relatively-fixed position with respect to the base station 160. For example, a subscriber unit may be a laptop computer operated in the user's home. The user may move the laptop computer from one location to another within the house. Each such move does not significantly change the distance between the base station and the subscriber unit, but each move can significantly alter the radio frequency characteristics of the communications link between the base station and the subscriber unit.

FIG. 1 illustrates one base station 160 and three mobile subscriber units 60 in a cell 50 by way of example only and for ease of description of the invention. The invention is applicable to systems including typically many more subscriber units communicating with one or more base stations in an individual cell, such as the cell 50.

It is also to be understood by those skilled in the art that FIG. 1 may be a standard cellular type communications system employing differing signaling schemes such as a CDMA, TDMA, GSM or others in which the radio channels are assigned to carry data and/or voice between the base station 104 and subscriber units 60. In a preferred embodiment, FIG. 1 is a CDMA-like system, using code division multiplexing principles such as those defined in the IS-95B standards for the air interface.

The invention provides the mobile subscriber units 60 with an antenna 100 that provides directional reception of forward link radio signals transmitted from the base station 160, as well as directional transmission of reverse link signals, via a process called beam forming, from the mobile subscriber units 60 to the base station 160. This concept is illustrated in FIG. 1 by the example beam patterns 71 through 73 that extend outwardly from each mobile subscriber unit 60 more or less in a direction for best propagation toward the base station 160. By being able to direct transmission more or less toward the base station 160, and by being able to directively receive signals originating more or less from the location of the base station 160, the antenna apparatus 100 reduces the effects of intercell interference and multipath fading for the mobile subscriber units 60. Moreover, since the transmission beam patterns 71, 72 and 73 are extended outward in the direction of the base station 160 but are attenuated in most other directions, less power is required for transmission of effective communications signals from the mobile subscriber units 60-1, 60-2 and 60-3 to the base station 160.

Figure 2:
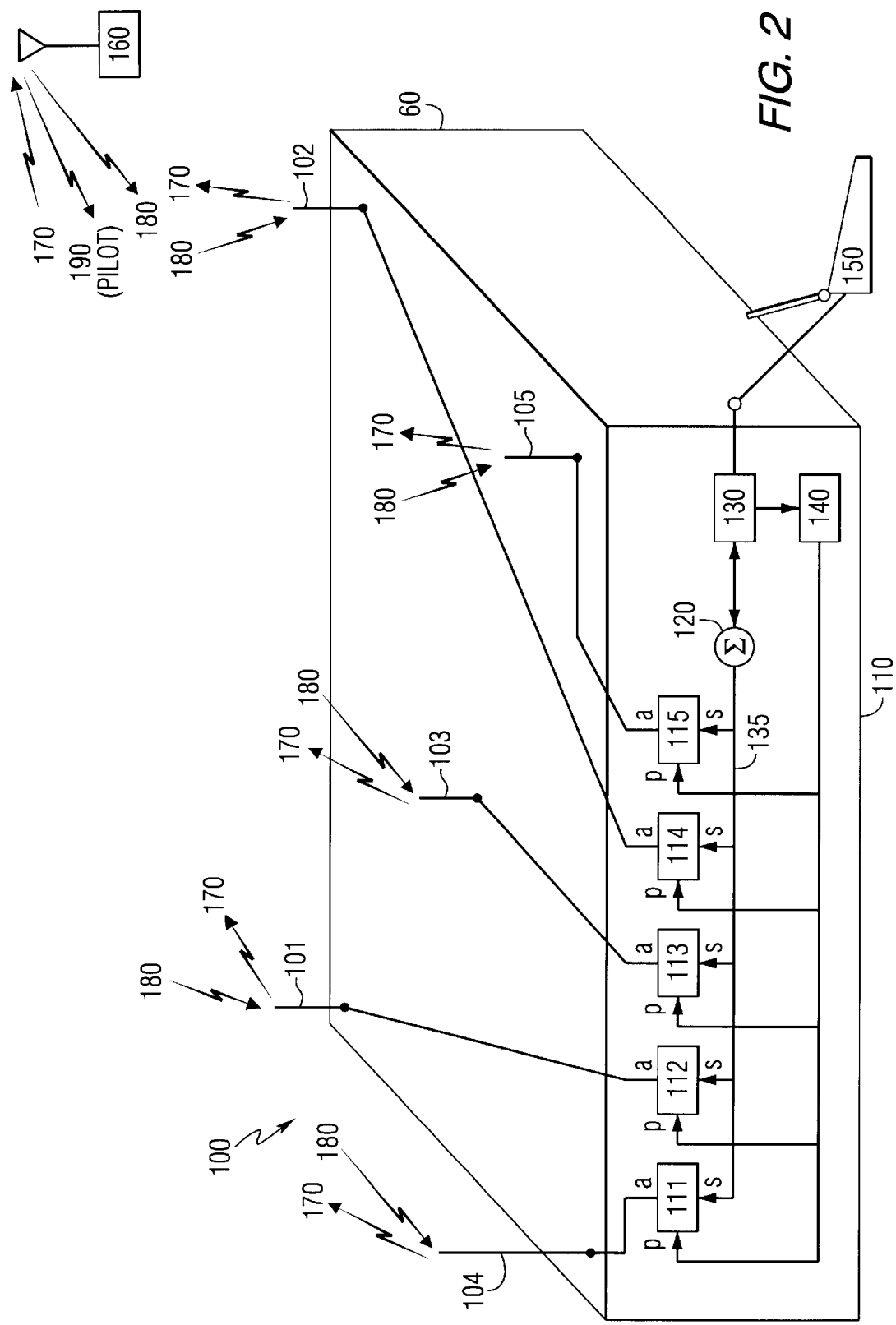
FIG. 2 illustrates a preferred configuration of an antenna apparatus used by a mobile subscriber unit in a cellular system according to this invention.

FIG. 2 illustrates a detailed isometric view of a mobile subscriber unit 60 and an associated antenna apparatus 100 configured according to one embodiment of the present invention. Antenna apparatus 100 includes a platform or housing 110 upon which are mounted five antenna elements 101 through 105. Within housing 110, the antenna apparatus 100 includes weight control elements 111 through 115, a bi-directional summation network or splitter/combiner 120, a transceiver 130, and a controller 140, which are all interconnected via a bus 135. As illustrated, the antenna apparatus 100 is coupled via the transceiver 130 to a laptop computer 150 (not drawn to scale). The antenna 100 allows the laptop computer 150 to perform wireless data communications via forward link signals 180 transmitted from the base station 160 and reverse link signals 170 transmitted to the base station 160.

In this embodiment, each antenna element 101 through 105 is disposed on the surface of the housing 110 as illustrated in FIG. 2. Here, four elements 101, 102, 104 and 105 are respectively positioned at locations corresponding to the corners of a rectangle, and a fifth antenna element 103 is positioned at a location corresponding to the approximate center of the rectangle. The distance between each element 101 through 105 is great enough so that the relationship between a signal received by more than one element 101 through 105 will be out of phase with other elements that also receive the same signal, assuming all elements 101 through 105 have the same phase setting for their respective weight control components 111 through 115.

However, according to the operation of the antenna 100 in this invention, the weight control components 111 through 115 are adjustable to affect the directionality of signals to be transmitted and/or received to or from the subscriber unit (i.e., laptop computer 150 in this example). By properly adjusting the weight control components for each element 101 through 105, the reverse link signal 170 (including contributions from each of the antenna elements 101 through 105) is formed that is positionally directed in the direction offering the optimum reception of the signal transmitted by the base station 160. That is, the optimal arrangement for the weight control components for sending a reverse link signal 170 from the antenna 100 is a phase setting for each antenna element 101 through 105 that creates a directional reverse link signal beam former. The result is an antenna 100 that directs a stronger reverse link signal pattern in the direction providing the optimum received signal at the base station 160.

The positions of the weight control components used for transmission of the reverse link signal 170 also cause the elements 101 to 105 to optimally receive forward link signals 180 transmitted from the base station 160. Due to the controllable nature and the independence of the weight control components for each antenna element 101 through 105, only those forward link signals 180 transmitted from the base station 160 that are intended to be received at the subscriber unit 60 are optimally received. The elements 101 through 105 reject other signals that are not intended for the particular subscriber unit 60. In other words, a directional antenna is formed by adjusting the weight control components of each element 101 through 105.

The summation network 120 is coupled to the signal terminal S, of each weight control component 111 through 115. During signal transmission, the summation network 120 provides a reverse link signal to each of the weight control components 111 through 115. The weight control components 111 through 115 impart a weight (i.e., affecting the amplitude, phase or amplitude and phase) to the input signal, as determined by a control input signal P provided to each weight control component 111 through 115 by the controller 140. Applying a weight value to the reverse link signals 170 transmitted from each element 101 through 105, causes constructive or destructive interference with the signals transmitted from the other elements. In this manner, constructively interfering signals combine to form a strong composite beam for the reverse link signals 170 in the desired direction. The weight provided to the signal transmitted from each antenna element 101 through 105 determines the direction in which the stronger composite beam is transmitted.

The weight control components used for transmission from each antenna element 101 through 105, also provide a similar physical effect on a forward link frequency signal 180 that is received from the base station 160. That is, as each element 101 through 105 receives a signal 180 from the base station 160, the respective received signals are initially out of phase with each other due to the location of each element 101 through 105 upon base 110. However, each received signal is weighted by the weight control components 111 through 115 under control of the signal at the P terminal thereof, as supplied by the controller 140. The adjustment brings each signal in phase with the other received signals 180. Accordingly, the signal quality metric associated with the composite received signal, produced by the summation network 120, is optimized.

To optimally establish the weight value for each of the weight control components 111 through 115 of the antenna 100, weight control values are provided by the controller 140. In one embodiment, the controller 140 determines these optimum weights during idle periods when the laptop computer 150 is neither transmitting nor receiving payload or informational data via the antenna 100. During this idle time, a received signal, for example, a forward link pilot signal 190 that is continuously sent from the base station 160 and is received by each antenna element 101 through 105 affects adjustment of the weight control components 111 through 115 to optimize reception of the pilot signal 190 from the base station 160, such as by maximizing the received signal energy or another selected signal quality metric.

The controller 140 thus determines and sets an optimal weight value for each weight control component 111 through 115, based on an optimized reception of the forward link pilot signal 190. When the antenna 100 returns to the active mode for transmission or reception of information signals between the base station 160 and the laptop 150, the weights supplied for each weight control component 111 through 115 remain as set during the previous idle period.

Before a detailed description of the phase shift computation as performed by the controller 140 is given, it should be understood that the invention is based in part on the observation that the location of the base station 160 in relation to any one mobile subscriber unit (i.e., laptop 150) is approximately circumferential in nature. That is, if a circle is drawn around a mobile subscriber unit 60 and base station locations are assumed to have a minimum of one degree of granularity, the base station 160 can be located at 360 possible angular locations with respect to the subscriber unit 60. The combination of the five phase shift values (one value for each of the weight control components 111 through 115) associated with each antenna element 101 through 105, optimizes the antenna pattern through 360° of rotation. Depending upon the phase shift values attainable from the weight control components 111 through 115, a granularity of less than one degree can also be realized. Those skilled in the relevant art recognize that the antenna 100 can comprise n elements for implementing the teachings of the present invention.

Figure 3:
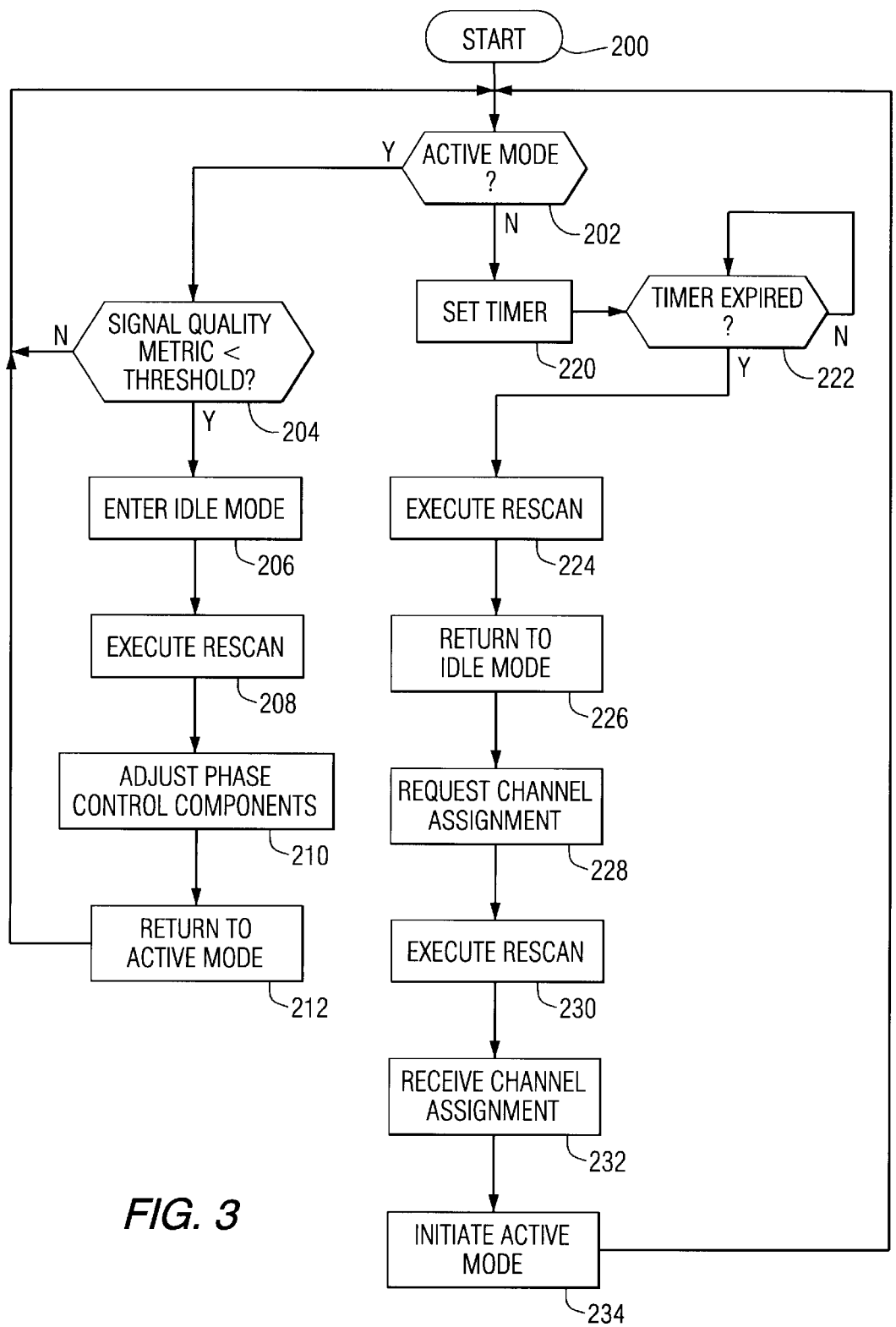
FIGS. 3, 4, 5 and 6 are flow charts of the processing steps performed during the antenna rescan process of the present invention.

In addition to the establishing the optimal weights during idle periods as discussed above, the present invention describes a rescan process during which the antenna 100 is scanned to a plurality of directional angles to determine the angle providing an optimum signal quality metric. FIG. 3 illustrates a software flowchart for determining the rescan timing and executing the re-scan process in accordance with one embodiment of the present invention. The illustrated process (as well as the software processes shown in FIGS. 4, 5 and 6) can be executed by the controller 140 or a dedicated or general-purpose processor in the subscriber unit 60.

The FIG. 3 process begins at a start step 200 and proceeds to a decision step 202 where the subscriber unit mode is determined. If the subscriber unit 60 is in the active mode (i.e. transmitting or receiving informational data packets, also referred to as payload data) then the FIG. 3 process moves to a step 204 where a specifically identified signal quality metric is checked to determine whether the metric is below a threshold value. The specific process for detecting and measuring the signal quality metrics are discussed in the cross-referenced applications identified above. Exemplary signal quality metrics that can be used in accordance with the present invention include: the ratio of energy per bit ($E_b$) to interference ($I_o$), the ratio of energy per bit to thermal noise ($N_o$), the ratio of energy per bit to thermal noise plus interference ($N_o+I_o$), the energy per chip ($E_c$) to either the thermal noise, the interference, or the sum of the thermal noise and the interference, and the correlated power and the signal to noise ratio (where the noise is defined as either the thermal noise, the interference or the sum of noise and interference). If the selected signal quality metric, as evaluated at the decision step 204, is not less than the threshold value, this indicates that the communications link between the subscriber unit 60 and the base station 160 is apparently functioning acceptably at the current directional angle. Processing thus returns from the decision step 204 back to the decision step 202. The frequency at which the signal quality metric is checked at the decision step 204 can be timer-controlled by interposing a timer (not shown in FIG. 3) between the decision steps 202 and 204.

If the selected signal quality metric is below the threshold value, processing moves from the decision step 204 to a step 206 where the idle mode is initiated, i.e., the transmission and reception of the information signals is suspended. As discussed above, in the idle state the subscriber unit is responsive to a pilot signal transmitted from the base station 160. The signal quality metric is evaluated at various scan angles during execution of the re-scan process, as indicated at a step 208. During the re-scan process, the weight control components 111 through 115 are adjusted to move the antenna directional angle through a plurality of directional angles. Thus to execute the scan process, one or more of the weight control component settings is changed, resulting in a change of the antenna directional angle. One technique for scanning the antenna beam through various directional angles is described in the co-pending and co-owned issued patent entitled, "Method and Apparatus for Adapting Antenna Array to Reduce Adaptation Time While Increasing Array Performance", U.S. Pat. No. 6,473,036 issued on Oct. 29, 2002, wherein a two-step process is utilized for adjusting the weight control components 111 through 115. Irrespective of the specific process utilized for changing the antenna directional angle, once a new directional angle is established, a specified signal quality metric is determined for the pilot signal at that angle. After the signal quality metric has been measured at a predetermined number of directional angles or after the rescan process has continued for a predetermined time, the signal quality metric values are analyzed to identify the optimum value. At a step 210, the weight control components 111 through 115 are then adjusted to the directional angle associated with the optimum signal quality metric. From the step 210, processing moves to a step 212 for reactivating the active mode, followed by return to the decision step 202. As will be discussed herein below, rescanning can also be performed during the active operational mode on known data.

Returning to the decision step 202, if the subscriber unit 60 is not in the active mode, (i.e., the operative mode is the idle mode) processing moves to a step 220 where a timer is set, followed by a decision step 222 where the timer status is determined. If the timer has not expired, processing continues looping through the decision step 222 as shown. When the timer expires, a re-scan is executed at a step 224. The rescan process executed at this stage of the process is identical to that described in conjunction with the step 208. Following completion of the re-scan, the subscriber unit 60 returns to the idle mode at a step 226. Later, when the subscriber unit wishes to transmit an information signal to the base station 160, a channel assignment is requested at a step 228. At this point, it is preferable to have already identified the best directional angle so that the weight control components 111 through 115 can be set to achieve that angle either immediately before or immediately after the channel assignment is requested. With the optimum directional angle established and implemented prior to the request for a channel assignment, system latency is reduced. However, in another embodiment of the present invention, another rescan can be executed (see a step 230) after a channel assignment is requested. For instance, if the time between the re-scan at the step 224 and the channel assignment request is less than a predetermined time, then it is acceptable to use the directional angle identified during the step 224 re-scan process. If, however, the elapsed time is greater than this predetermined value, it is advantageous to execute another rescan as illustrated by the step 230. In any case, the channel assignment is received as indicated at a step 232 and the active mode is initiated as shown at a step 234. Once the active mode is initiated, the antenna directional angle, as determined by the setting of the weight control components 111 through 115 to implement the optimum identified signal quality metric, is maintained so long as the channel assignment received at the step 323 is maintained. Of course, if the signal quality metric of choice falls below a predetermined threshold, while the subscriber unit 60 is in the active mode, then the process beginning at the decision step 204 is executed to locate a new directional angle for the antenna 100. In addition to initiating the rescan process in response to a channel assignment request, in other embodiments of the present invention, other events can be used to trigger the rescan, such as movement between cell sectors or other link layer events (where the link layer is as defined in the OSI network model).

Figure 4:
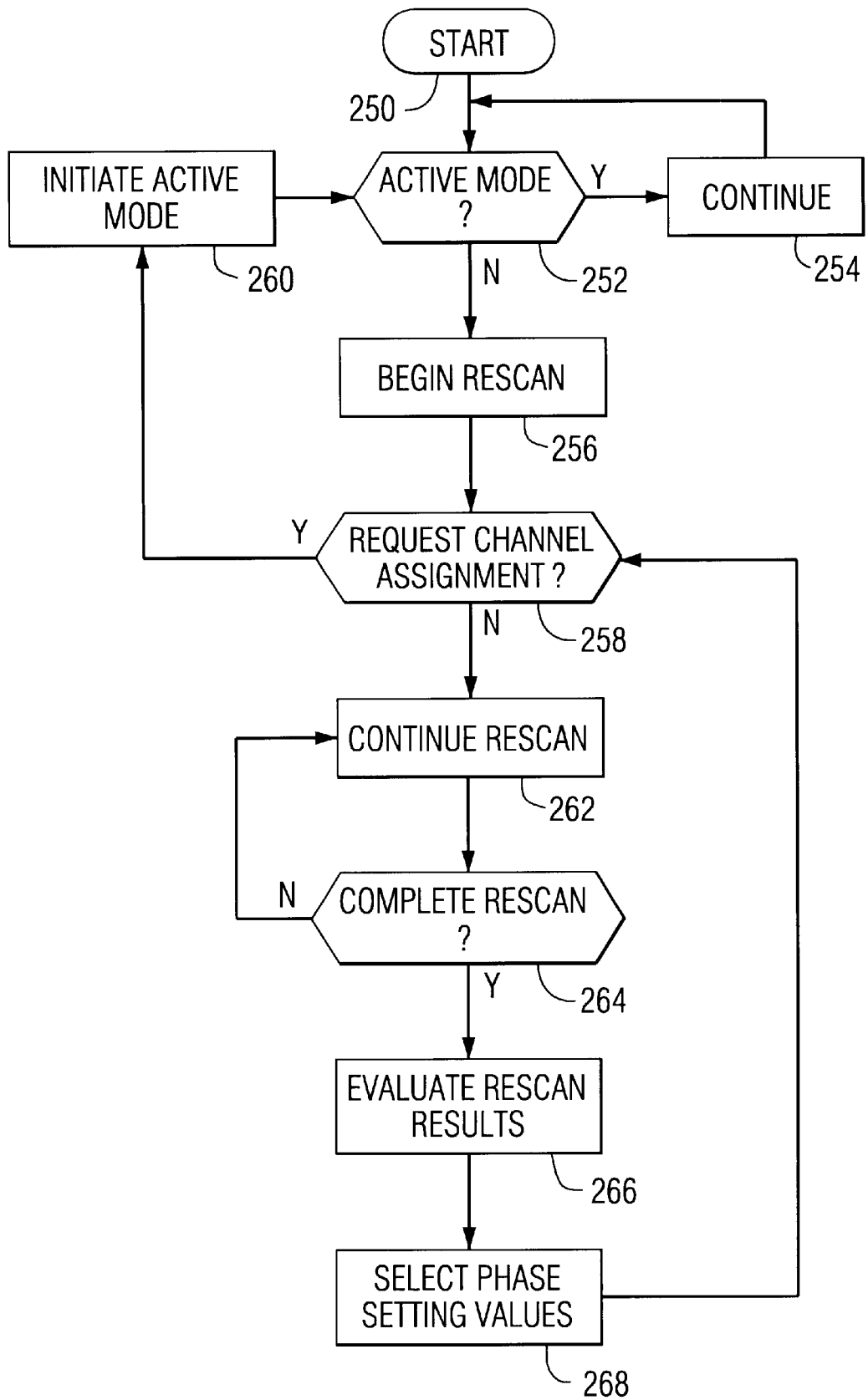

Another embodiment of the present invention is depicted in the flowchart of FIG. 4 where an idle mode rescan is executed on a predetermined frequency cycle. The process begins at a start step 250 and proceeds to a decision step 252. If the subscriber unit 60 is in the active mode, processing loops back to the input of the decision step 252, as indicated by a continue step 254. When in the active mode, in lieu of the continue step 254, the re-scan processes as set forth in FIG. 3 (beginning at the step 204) or as set forth in FIG. 5 (to be discussed further herein below) can be implemented.

If the subscriber unit 60 is not in the active mode, processing proceeds from the decision step 252 to a step 256 where the re-scan process is begun and continues. If the re-scan process is interrupted by a channel assignment request (see a decision step 258) then the subscriber unit 60 switches to the active mode, as indicated at a step 260. As the subscriber unit 60 initiates the active mode, there are several available choices for the antenna directional angle. According to one embodiment of the present invention, the directional angle employed can be the angle used during the last transmission from the subscriber unit 60 to the base station 160. Alternatively, the optimum directional angle can be determined by evaluating the signal quality metric values measured at the step 256 before the rescan process was interrupted by the channel assignment request. In yet another embodiment, when the rescan process is interrupted by the channel assignment request, the channel assignment can be delayed until after the rescan process executed at the step 256 is complete. In this later embodiment, effectively the steps 262, 264, 266 and 268 are executed before the channel is assigned by the base station 160.

Returning to the FIG. 4 embodiment, until a channel assignment is requested (see the negative result from the decision step 258) the re-scan process continues as illustrated at the step 262. The decision step 264, determines when all potential angles have been scanned. In one embodiment, this can involve the scanning of 360° at a predetermined angle per scan, such as the one degree of granularity discussed above. In another embodiment, a scan sector can be determined based on the approximate relative position of the subscriber unit 60 and the base station 160. In this embodiment only angles within that sector are scanned. Angles outside the sector are not checked because they may have a low probability of producing a signal quality metric better than directional angles within the sector. However, the chosen sector may not produce the optimum signal quality metric as interference characteristics can influence the signal quality metric for directional angles both within and without the sector, thus producing an optimum signal quality metric at a directional angle outside the sector. After the antenna has been scanned through each of the candidate scan angles and the signal quality metric from each determined, processing moves to a step 266 where the signal quality metric for each angle scanned is evaluated and the optimum value selected. At a step 268, the weight control components 111 through 115 are adjusted to the scan angle selected at the step 266. In various embodiments of the present invention, the scan or directional angle selected at the step 268 can be employed for a predetermined period of time, until the next channel assignment request, until the occurrence of another link layer event, or until a signal quality metric falls below a predetermined threshold. Following the step 268 the process returns to the decision step 258, where the affirmative branch is selected when a channel assignment is requested.

Figure 5:
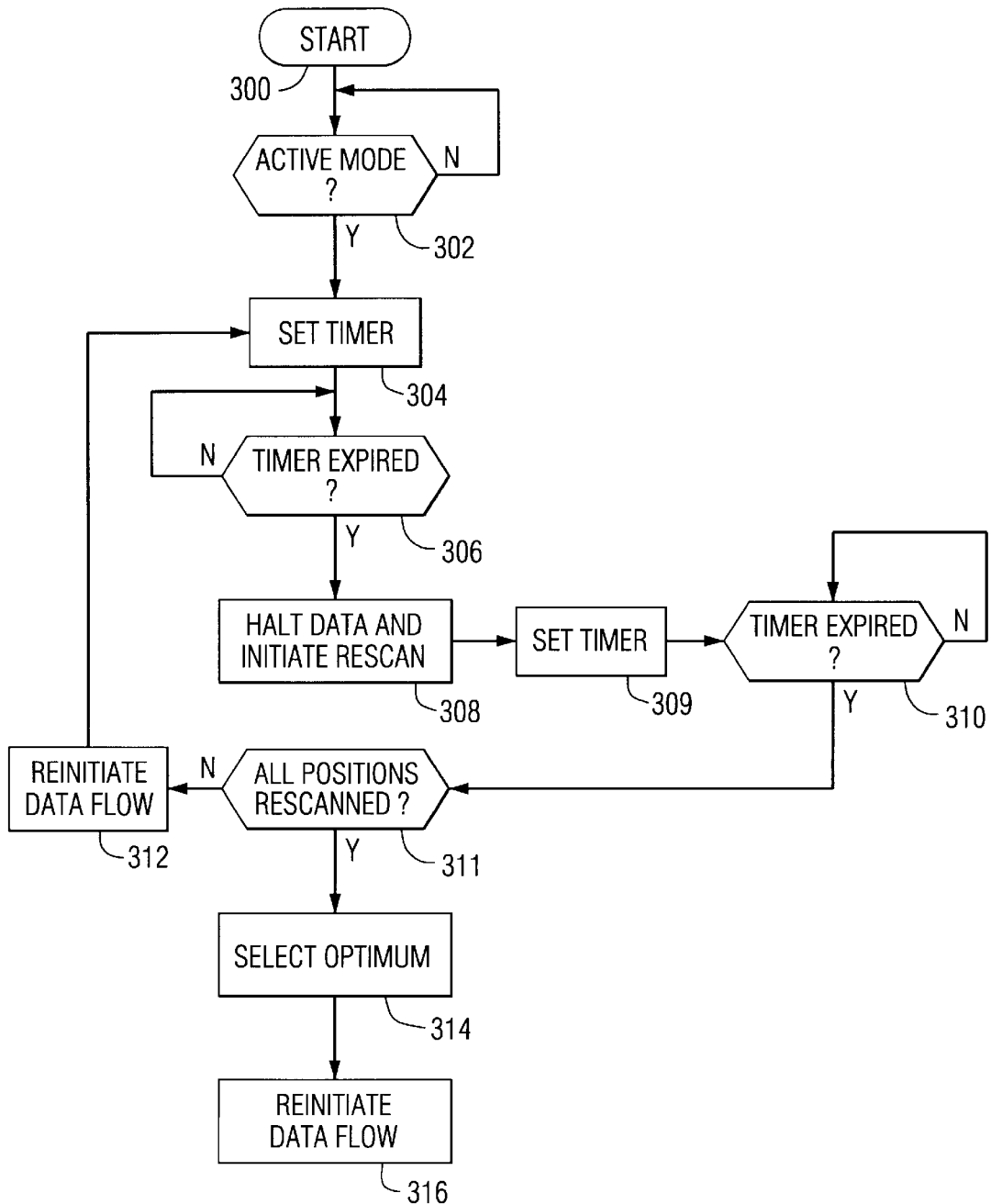

FIG. 5 illustrates another rescan methodology that involves puncturing the active mode data transmissions to or from the subscriber unit 60 to execute a rescan. Data bits transmitted during this puncture period are lost at the receiver because the receiver circuitry is occupied with the rescan process. The FIG. 5 process begins at a start step 300 and continues to a decision step 302. If the subscriber unit is not in the active mode then the FIG. 5 process loops back through the decision step 302. In lieu of simply looping back to the decision step 302, the negative path therefrom can include any of the various idle mode rescan processes discussed herein, including the FIG. 3 process beginning at the step 220. The FIG. 5 process takes advantage of the forward error correcting process employed at the receiver (the subscriber unit 60 for reverse link signal and the base station 160 for forward link signals) to detect and correct errors in the received bit stream. Such forward error correcting techniques, which are well known in the art, require the inclusion of forward error correcting bits to the each data word in the bit stream. The number of these bits, referred to as a checksum, appended to a data word determines the forward error correcting power, i.e., the number of errors that can be detected and corrected in the data word. Thus, to ensure that the receiver can recover the correct data word from a punctured data word, the puncture period must be limited in duration to the number of lost bits that the checksum can detect and correct. Higher data rates require shorter puncture periods.

In another embodiment, if the period during which the data is to be punctured is coordinated between the base station 160 and the subscriber unit 60, and therefore known a priori, the sending unit can increase the checksum length during the puncture period to increase the number of detectable and correctable errors in the received data word. This is advantageous as the receiving unit's ability to detect and correct errors due to thermal noise during the puncture period is degraded, because the checksum bits are required to detect and correct the errors caused by puncturing through the data bits.

Returning to the FIG. 5 process, if the subscriber unit 60 is in the active mode, processing continues on the affirmative branch of the decision step 302. A first timer is set at a step 304 and processing loops around a decision step 306 until the first timer expires. At that point, the data receiving or transmitting process is interrupted (i.e., the data puncturing begins) and a rescan of candidate directional angles begins. See a step 308. Although the rescan process is initiated based on a timer value, it is known by those skilled in the art that other events can be used as the trigger for the rescan. The system operator must achieve a compromise rescan frequency. Rescanning too frequently to optimize the signal quality metric may degrade system performance by increasing latency. During the rescan process, the subscriber can determine the signal quality metric using the pilot signal 190 (which means effectively, that the subscriber unit has entered the idle mode) or using known data transmitted from the base station 160.

A second timer for controlling the rescan period, which is a function of the forward error correcting power as discussed above, is set at a step 309. At a decision step 310 the second timer value is checked and when the second timer expires, processing moves to a decision step 311 for determining whether all the potential directional angles have been evaluated. If the re-scan process was terminated without evaluation of all potential angles, the result at the decision step 311 is negative and processing continues to a step 312, where the transmission or reception of data packets is restarted. From the step 312, the timer is reset at the step 304 and the re-scan process begins anew when the first timer expires.

If the decision step 311 result is affirmative, at a step 314 the optimum directional angle is identified based on the signal quality metric at each of the candidate directional angles. Following the selection of a new primary directional angle, the process moves to a step 316 where the flow of data packets is reinitiated. In another embodiment, the step 316 is followed by a step for checking the signal quality metric of the received signal and if it drops below a predetermined threshold, a rescan is initiated. See for example, the step 204 of FIG. 3.

As is known by those skilled in the art, the subscriber unit 60 includes a number of control loops for demodulating and detecting the received signal and operative also in the transmit mode. Exemplary control loops include automatic frequency control loops, automatic gain control loops, digital locked loops and phase locked loops. It is also known that to maintain these loops in a locked condition it is necessary that they process incoming signals. Thus, if the rescan process continues for a time beyond which these loops can maintain a locked condition, one or more of the loops may become unlocked. Thus, in one embodiment, it is necessary to terminate the rescan process (by way of the second timer 309 in FIG. 5) and return to the processing of informational data to maintain the loops in the locked condition. Thus, in various embodiments it is necessary to determine the second timer value based on the forward error correcting power and/or the time during which one or more of the control loops can maintain a locked condition.

Figure 6:
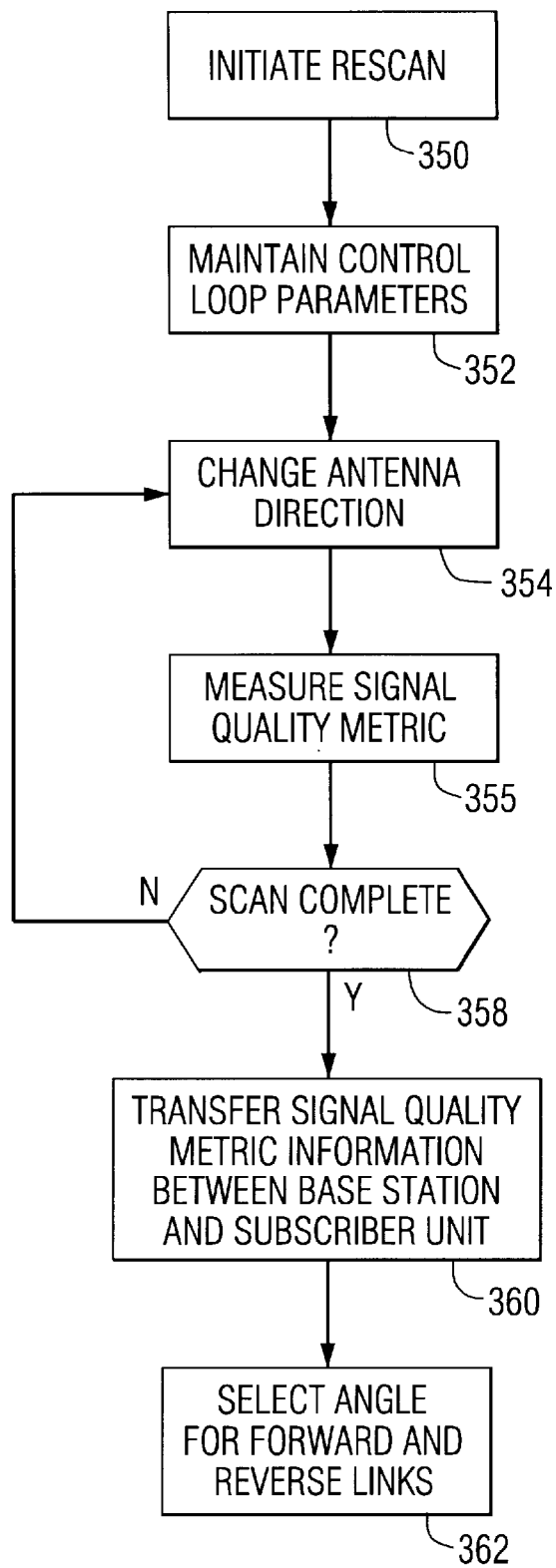

FIG. 6 illustrates generally the process steps executed during a rescan of candidate directional angles for the antenna 100. A rescan is initiated as shown by a step 350 under several conditions as discussed above. For example, when a selected signal quality metric drops below a predetermined threshold value a re-scan is initiated. In the idle or active mode, a timer can be set upon the occurrence of a specified event and a rescan initiated when the timer has expired. In another embodiment, a re-scan is initiated either prior to or immediately following a channel assignment request issued by the subscriber unit 160.

Once the re-scan has been initiated, the process proceeds to a step 352 where certain control loop parameters must be maintained. For instance, the subscriber unit 60 includes an automatic gain control loop, an automatic frequency control loop and a digital locked loop, each loop operating with certain parameters that maintain the loop in a locked configuration. These locked loop parameters must be maintained during the rescan process so that when the subscriber unit 60 returns to the primary antenna direction, the loops will immediately engage in a locked state. The loop parameters can be stored during the rescan process and the stored values used when the antenna 100 returns to the primary direction for transmitting and receiving information data packets. Otherwise, each loop must regain its locked state, which takes a finite amount of time, when the antenna 100 returns to the primary direction. In lieu of maintaining the control loop parameters by storing them, the subscriber unit 60 can return to the primary direction at a specified frequency, thereby allowing the control loops to remain in a locked state. The frequency at which the subscriber unit 60 returns to the primary direction depends on the time constant of each control loop. If the time constant of one control loop is shorter than the re-scan time (defined as the time during which the subscriber unit 60 moves to a new scan angle, checks the signal quality metric there and returns to the primary direction) then the control loop parameters must be stored since the locked condition cannot be maintained while the antenna is scanning away from the primary direction.

At a step 354, the antenna scans to a new direction by changing the weight control components 111 through 115. A selected signal quality metric is measured at step 355. Potential signal quality metrics include the received power, the received signal to noise ratio, the correlated power, the ratio of the energy per bit ($E_b$) to either the total thermal noise ($N_o$), the total interference ($I_o$) or the sum of the thermal noise and the total interference. In lieu of the energy per bit, the energy per chip ($E_c$) can be used as a signal quality metric.

In one embodiment, both the base station 160 and the subscriber unit 60 perform the signal quality metric evaluation. The subscriber unit 60 utilizes the pilot tone transmitted from the base station 160 for this measurement. The base station 160 utilizes a known set of data transmitted by the subscriber unit 60. The directional angle of the transmission received at the base station 160 must be known so that the measured signal quality metric can be associated with the correct directional angle. To accomplish this, the base station determines the rescan start time and must know the scan pattern. These two factors allow the base station 160 to correlate each signal quality metric measurement with the correct scan angle. Alternatively, the known signal transmitted from the subscriber unit 60 for measuring the signal quality metric at the base station 160 includes a portion representative of the directional angle. The directional angle information can thus be easily associated with the directional angle at the base station 160. Thus, the signal received at the subscriber unit 60 provides for an evaluation of the reverse link scan angles, and the signal evaluation at the base station 160 provides an evaluation of the forward link quality.

The FIG. 6 process then moves to a decision step 358 to determine whether the scanning process is complete. The scanning process can be time limited; therefore when the time has expired the scanning process is concluded and the antenna 100 returns to the primary directional angle. Alternatively, the scanning process can cover a predetermined number of directional angles and when that number has been evaluated, the scanning process terminates. Further, to limit the scanning period, the scanning process can continue until a signal quality metric exceeds a predetermined value. Although this will likely not produce the optimum signal quality metric, it is a technique that effectively reduces the scanning time, representing a compromise between finding the optimum signal quality metric and arriving at an acceptable signal quality metric before all the angles have been scanned. In yet another embodiment, the scanning process can be executed during a series of successive scan intervals wherein different angles are scanned and evaluated during each interval, wherein the angles may not be contiguous. Finally, it is also possible to conduct a partial signal quality metric evaluation at a given scan angle during one re-scan and return to that angle during a subsequent scan period to complete the evaluation. As can be appreciated by those skilled in the art, there are several scan methodologies available.

In the embodiment, when the rescanning occurs during the active mode using informational data bits (rather than the pilot signal or known data bits), the data bits received at a directional angle can be used to maintain the primary direction control loops, so long as the signal quality metric at that directional angle exceeds a predetermined threshold. If the signal quality metric is below the threshold value, the received data packets cannot be used to maintain the control loops and in some cases it may not be possible to demodulate and detect the data packets. In the latter case, the forward error correction process detects and corrects the lost data symbols. Note that this process wherein the primary directional antenna angle and the control loops are updated during the rescan process using the received data symbols can be used only when the data symbols at the new directional angle are time-aligned with the data symbols at the previous directional angle.

When the rescan process is complete, the decision step 358 produces an affirmative response followed by a step 360, where the signal quality metric information is transferred between the base station 160 and the subscriber unit 60. As discussed above, the base station 160 has acquired signal quality metric information for the forward link and the subscriber unit 60 has acquired signal quality metric information for the reverse link. In one embodiment, the subscriber unit 60 analyzes the signal quality metric information for both the forward link and the reverse link. In this embodiment, the forward link signal quality metric information collected at the base station 160 must be transferred from the base station 160 to the subscriber unit 60 so that the forward link evaluation can be performed at the latter. Alternatively, if the base station 160 analyzes the forward and reverse link signal quality information and selects the optimum directional angles for each link, then the subscriber unit signal quality metric information is transmitted thereto at the step 360. Generally, whenever the signal quality metric evaluation is performed at other than the site where the directional angle is set, then the signal quality metric information must be transferred to the other site for use in establishing the directional angle. Note that as an alternative embodiment to the process illustrated in FIG. 6, the step 360 can be relocated immediately prior to the decision step 358. In this embodiment signal quality metric information is transferred between the base station 160 and the subscriber unit 60 immediately following evaluation of the signal quality metric at the scanned angle. As indicated at a step 362 an antenna angle or direction is selected for the forward link and the reverse link. Likely these two angles will not be identical.

Typically, a system constructed according to the teachings of the present invention operates in a full duplex mode. However, in an embodiment where the antenna 100 does not change directional angles when switching from the forward to the reverse link (or vice versa) an angle must be selected for use on both the forward and reverse links at the subscriber unit 60, and the selected angle should represent a combination of the optimum selected forward and reverse link directional angles. For instance, if the majority of the data is being carried on the forward link, then a subscriber unit directional angle that favors the optimum forward link directional angle should be used. Alternatively, the combination angle may be selected to ensure that one or both links maintain a minimum signal quality metric.

In yet another embodiment (not illustrated in FIG. 6) the signal quality metric data accumulated for each scanned directional angle is stored for later analysis to identify the optimum directional angle. As discussed above, this analysis can be performed at the base station 160 or the subscriber unit 60 so long as the relevant data is present at the evaluation site. Alternatively, during the rescanning process the subscriber unit 60 can sequentially compare each signal quality metric value with the immediately preceding signal quality metric value and select the best directional angle on the basis of that comparison. In this mode, once the re-scan period has ended, the subscriber unit 60 utilizes the identified optimum scan angle for data transmission and reception.

In yet another embodiment of the present invention (not illustrated in FIG. 6) the re-scanning process is performed in a deterministic pattern known a priori by both the subscriber unit 60 and the base station 160. In the conventional CDMA cellular system, the base station 160 commands the subscriber unit 60 to a higher (or lower) power level when the signal received at the base station 160 falls below (or above) a predetermined threshold. In the embodiment discussed above where the signal quality metrics of both the forward link and the reverse link are evaluated, it is necessary for the base station 160 to know when the subscriber unit 60 is transmitting informational data and when it is transmitting known data merely for the determination of a signal quality metric. If the base station 160 cannot or does not distinguish between informational data and known data, it may command the subscriber unit 60 to increase the output power level during transmissions that are intended for determining the signal quality metric. Thus, it is advantageous to perform coordinated reverse and forward link checks so that the base station 160 does not unnecessarily command the subscriber unit 60 to change its output power. A clock signal synchronized at the base station 160 and the subscriber unit 60, in conjunction with a predetermined a priori rescan time, can be used at the base station 160 to determine when the subscriber unit 60 is in a re-scan mode. In lieu of using a clock signal, the base station 160 can search for a known data pattern in the received signal and thereby determine that the subscriber unit 60 is engaged in the re-scan process. The base station 160 does not exercise power control over the subscriber unit 60 when the latter is re-scanning in search of a better directional angle.

Figure 7:
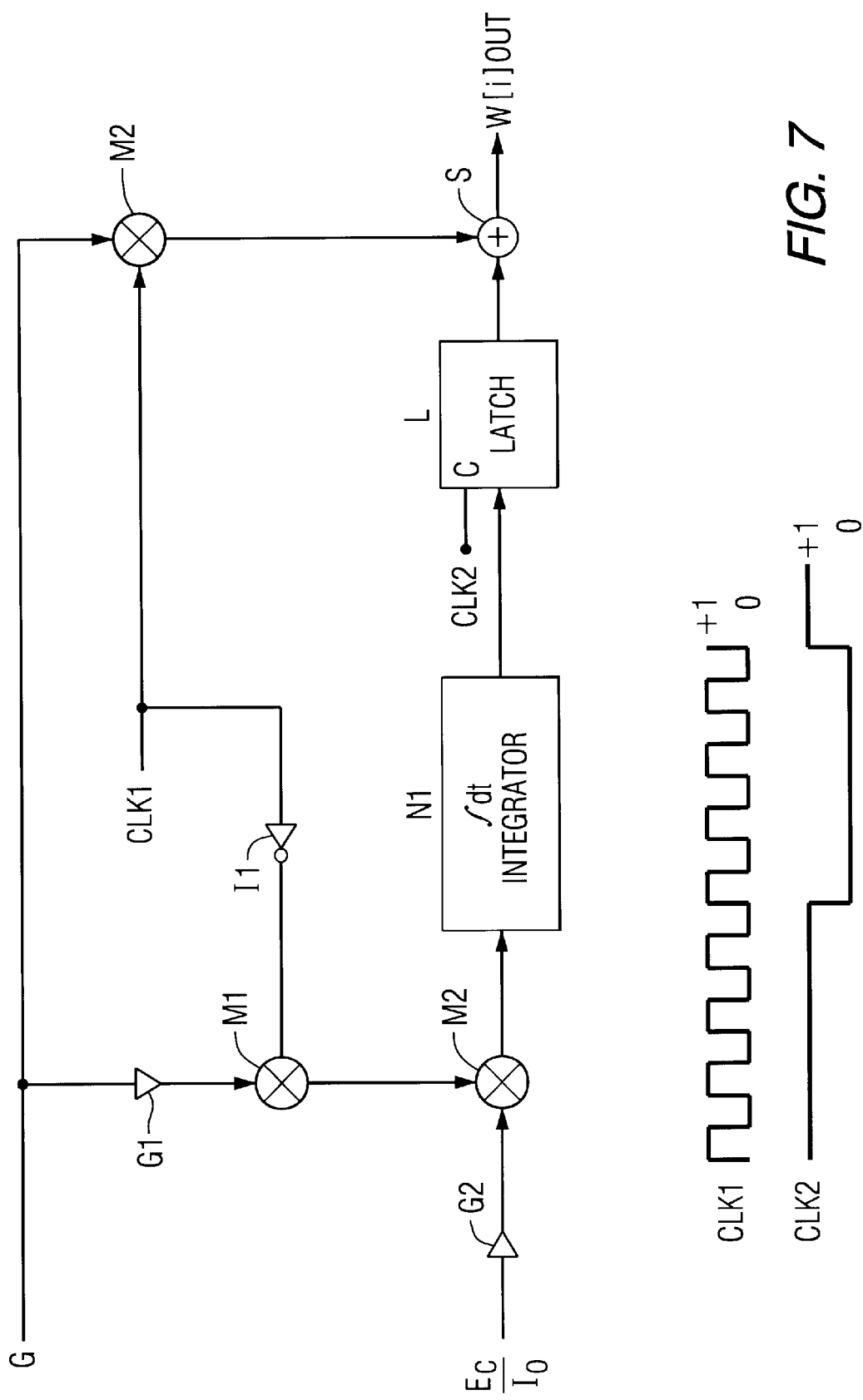
FIG. 7 is a schematic diagram of an apparatus for identifying the optimum signal quality metric.

FIG. 7 illustrates a schematic of electronic components for implementing a perturbational algorithm to determine optimal weight settings for each antenna element 101 through 105.

The algorithm fixes a value for four of the five unknown, optimum weight settings W[i], e.g. W[2] through W[5]. The algorithm perturbs the system and observes the response, adapting to find the optimum arrangement for the unfixed weight, e.g.,. W[1]. The measured link quality metric, in this embodiment $E_c/I_o$, is fed to a second gain block G2. A constant G is input to a first gain block G1. A first fast clock, CLK1, which alternates from a value of "1" to a value of "−1" is inverted by I1 and fed to a first multiplier M1. The other input of multiplier M1 is fed by the gain block G1.

The output of M1 is fed to a second multiplier M2 together with the output of the second gain block G2. An integrator N1 measures an average level and provides this value to the latch L. A slow clock CLK2, typically alternating at a rate which varies between "1" and "0" and is much slower than CLK1 (by at least 100 times) drives the latch clock C. The output of the latch L is summed by summation block S with the non-inverted output of M2. The result, W[i], is a value which tends to seek a localized minimal value of the function to be optimized.

The process shown in FIG. 7 is then repeated by setting the first weight control components to W[1] and then determining W[2] by varying W[3] to W[5] in accordance with the FIG. 7 process. The process continues to find the optimum value for each of the five unknown weights.

Alternatively, instead of incrementally varying the weights for each antenna element 101 through 105, the weight for each element can be stored in a table of vectors, each vector having five elements representing the five weight settings for the weight control components 101 through 105. The five values in each vector can be computed in advance based upon the angle of arrival of the received pilot signal. That is, the values for each antenna element are predetermined according to the direction in which the base station is located in relation to the mobile subscriber unit. In operation, to scan the antenna directional angle, a vector is selected and the elements thereof are used as the weights applied by the weight control components 111 through 115. Further, in another embodiment if the angle of arrival of the optimum signal can be determined, then that angle is used as an index into the vector table, to set the optimum directional angle. In this embodiment, only the single angle of arrival calculation needs to be performed to properly set the weights for each antenna element 101 through 105.

The antenna apparatus in preferred embodiments of the invention is inexpensive to construct and greatly increases the capacity in a CDMA interference limited system. That is, the number of active subscriber units 60 within a single cell in a CDMA system is limited in part by the number of frequencies available for use and by signal interference limitations that occur as the number of frequencies in use increases. As more frequencies become active within a single cell, interference imposes maximum limitations on the number of users who can effectively communicate with the base station. Intercell interference (i.e., by and between adjacent cells) from other subscribers is also a limiting factor to cell capacity. The present invention provides an increase in cell capacity by the identification of an optimum directional angle for each subscriber unit 60.

Since this invention adaptively eliminates interference from adjacent cells and selectively directs transmission and reception of signals from each subscriber unit 60 equipped with the invention to and from the base station 160, an increase in the number of users per cell is realized. Moreover, the invention reduces the required transmit power for each subscriber unit 60 by optimizing the directional angle between the subscriber unit 60 and the base station 160.

Alternative physical embodiments of the antenna include a four element antenna wherein three of the elements are positioned at corners of an equilateral triangular plane and are arranged orthogonally and extend outward from that plane. The fourth element is similarly situated but is located in the center of the triangle. Further, the teachings of the present inventions are applicable to an antenna comprising a plurality of elements, where less than all of the elements are active elements, i.e., for radiating or receiving a signal where the other elements serve as parasitic elements to reflect, redirect or absorb some portions of the emitted signal to advantageously shape the transmitted beam in the transmit mode and similarly advantageously affect the receive beam pattern. The elements can be operative in either the active or parasitic mode as determined by an element controller.

Figure 8:
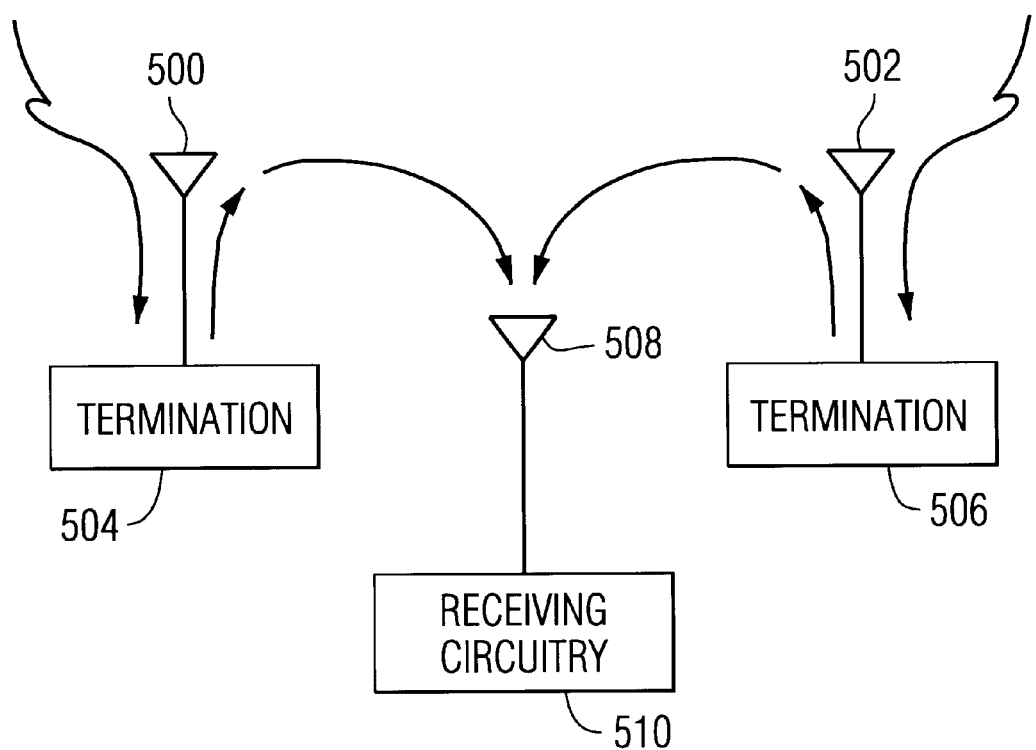
FIG. 8 illustrates another antenna embodiment to which the teachings of the present invention can be applied.

FIG. 8 illustrates such an antenna embodiment including both parasitic and active elements. Parasitic elements 500 and 502 are connected respectively to terminations 504 and 506. An active element 508 is connected to conventional receiving circuitry 510, such as that shown in FIG. 2. Although FIG. 8 illustrates two parasitic elements and a single active element, it is known by those skilled in the art that the fundamentals associated with FIG. 8 are extendable to n parasitic elements and m active elements. In one embodiment, for instance, the teachings of the present invention can be applied to four parasitic elements arranged at the corners of a rectangle and the active element at approximately the rectangle center.

In operation, a signal is received at each of the parasitic elements 500 and 502 as shown. The signal is then carried to the terminations 504, 506, respectively, and reflected back therefrom through the elements 500 and 502. The terminations 504 and 506 comprise any one of the following: a phase shifting device, a weight control component (such as the weight control components 111 through 115 of FIG. 2) an impedance termination and a switch. The terminations 504 and 506 control both the amplitude and phase, only the phase, or only the amplitude of the signal input thereto, and thereby produce a reflected signal having a certain relationship (i.e., amplitude and phase characteristics) with respect to the received signal. The reflected signals are radiated from the elements 500 and 502, and effectively combined upon receipt at the active element 508. It is seen that the FIG. 8 embodiment accomplishes these three primary objectives of an antenna array: receiving the signal at an element, imparting a phase or amplitude shift to the received signal and combining the received signals. Although the FIG. 8 configuration has been explained in the receiving mode, it is known by those skilled in the art that in accordance with the antenna reciprocity theorem a like a function is achieved in the transmit mode.

While this invention has been particularly shown and described with references to preferred embodiments, those skilled in the art will realize that various changes in form and details may be made therein without departing from the spirit and scope of the invention as defined by the appended claims. Those skilled in the art will recognize or be able to ascertain using no more than routine experimentation, many equivalents to the specific embodiments of the invention described herein. For example, there can be alternative mechanisms for determining the proper phase for each antenna element, such as storing phase angles in a linked list or a database instead of a table. Moreover, those skilled in the art of radio frequency measurement techniques understand there are various ways to detect the angle of arrival and signal quality metrics of a signal, such as the received pilot signal or a known data signal. These mechanisms for determining the signal angle of arrival and signal quality metrics are meant to be contemplated for use by this invention. Once the location is then known, the proper phase settings for weight control components may be quickly obtained. Such equivalents are intended to be encompassed within the scope of the claims.

What is claimed is:

1. A method for establishing optimal weights for a plurality of elements cooperating to form a subscriber unit antenna in a wireless communications system, in response to the occurrence of an event on the wireless communications system, said method comprising the steps of:

(a) applying weights to the signal received at each of the plurality of elements;

(b) detecting a received pilot signal at each of the plurality of antenna elements;

(c) combining the received pilot signal detected at each of the plurality of antenna elements to produce a combined received pilot signal;

(d) determining a signal quality metric for the combined received pilot signal at the current directional angle, as determined by the weights, of the subscriber unit antenna;

(e) adjusting the weights of at least one of the plurality of antenna elements to establish a different directional angle for the subscriber unit antenna;

(f) repeating steps (b) through (e);

(g) selecting the optimal signal quality metric of the combined received pilot signal; and (h) adjusting the weights for the plurality of antenna elements to achieve the directional angle associated with the selected optimal signal quality metric.

2. The method of claim 1 wherein the event is selected from among: a request for a channel assignment for the transmission of information over the wireless communications network, a signal quality metric dropping below a predetermined threshold.

3. The method of claim 2 wherein the weights associated with the selected optimal signal quality metric are fixed for the period during which information is transmitted over the assigned channel.

4. The method of claim 1 wherein the weights associated with the selected optimal signal quality metric are fixed until a signal quality metric drops below a predetermined threshold value.

5. The method of claim 1 wherein the optimal signal quality metric is selected such that a signal transmitted from the subscriber unit is formed into a directional beam by the cooperation of the plurality of elements to reduce interfering emissions at receivers not intended to receive the transmitted signal.

6. The method of claim 1 wherein the optimal signal quality metric is selected such that the signal power-to-interference ratio is maximized.

7. The method of claim 6 wherein the interference includes thermally generated noise.

8. The method of claim 6 wherein the interference includes interfering emissions received at the subscriber unit antenna from other users of the wireless communications system.

9. The method of claim 6 wherein the interference includes the sum of thermally generated noise and interfering emissions received at the subscriber unit antenna.

10. The method of claim 1 wherein the optimal signal quality metric is selected such that the bit error rate is minimized.

11. The method of claim 1 wherein the optimal signal quality metric is selected such that the correlated power is maximized.

12. The method of claim 1 wherein the optimal signal quality metric is selected such that the plurality of elements cooperate to form a directional receiving antenna for receiving signals sent from an intended transmitter and for suppressing the reception of signals received from other than the intended transmitter.

13. The method of claim 1 wherein the plurality of elements include first, second, third, and fourth elements positioned at locations corresponding to the corners of a rectangle and a fifth element positioned at a location corresponding to the approximate center of the rectangle.

14. The method of claim 13 including first, second, third, fourth and fifth weight control components for adjusting the weights associated with said first, second, third, fourth and fifth antenna elements, respectively.

15. The method of claim 14 wherein the first, second, third, fourth and fifth weight control components are adjustable to provide a predetermined degree of rejection for signals received by the subscriber unit antenna but not intended for the subscriber unit.

16. The method of claim 1 wherein multiple subscriber units transmit and receive code division multiple access signals on a common carrier frequency in the wireless communications system.

17. The method of claim 16 wherein the code division multiple access signals are transmitted and received within a cell and wherein each cell contains a base station and a plurality of subscriber units, each mobile subscriber unit having an antenna, and wherein each subscriber unit is portable.

18. The method of claim 1 wherein the wireless communications system comprises a system for providing wireless communications among a plurality of subscriber units using spread spectrum signaling for transmission and reception of information signals between a subscriber unit and a base station.

19. The method of claim 1 wherein the process of repeating steps (b) through (e) continues for a predetermined time.

20. The method of claim 1 wherein the process of repeating steps (b) through (e) continues until a signal quality metric has been determined for a predetermined number of directional angles.

21. The method of claim 1 wherein the process of repeating steps (b) through (e) continues until the signal quality metric has been determined for all candidate directional angles.

22. The method of claim 1 wherein the process of repeating steps (b) through (e) continues until a signal quality metric exceeds a predetermined threshold.

23. In a wireless communications system, a method for establishing optimal weights in a period during which known data is received at the subscriber unit, wherein the subscriber unit comprises a plurality of elements cooperating to form a subscriber unit antenna, said method comprising the steps of:

(a) applying weights to the signal received at each of the plurality of elements;

(b) detecting the known data at each of the plurality of antenna elements;

(c) combining the received known data detected at each of the plurality of antenna elements to produce a combined known data signal;

(d) determining a signal quality metric for the combined known data signal at the current directional angle, as determined by the weights, of the subscriber unit antenna;

(e) adjusting the weights of at least one of the plurality of antenna elements to establish a different directional angle for the subscriber unit antenna;

(g) repeating steps (b) through (e);

(h) selecting the optimal signal quality metric of the combined known data signal; and (i) adjusting the weights for the plurality of antenna elements to achieve the directional angle associated with the selected optimal signal quality metric.

24. The method of claim 23 wherein the weights associated with the selected optimal signal quality metric are fixed for a predetermined time.

25. The method of claim 23 wherein the weights associated with the selected optimal signal quality metric are fixed until a signal quality metric drops below a predetermined threshold value.

26. The method of claim 23 wherein the optimal signal quality metric is selected such that a signal transmitted from the subscriber unit is formed into a directional beam by the cooperation of the plurality of elements to reduce interfering emissions at other subscriber units of the wireless communications system not intended to receive the transmitted signal.

27. The method of claim 23 wherein the optimal signal quality metric is selected such that the signal power-to-interference ratio is maximized.

28. The method of claim 27 wherein the interference includes thermally generated noise.

29. The method of claim 27 wherein the interference includes interfering emissions received at the subscriber unit antenna from other users of the wireless communications system.

30. The method of claim 27 wherein the interference includes the sum of thermally generated noise and interfering emissions received at the subscriber unit antenna.

31. The method of claim 23 wherein the optimal signal quality metric is selected such that the bit error rate is minimized.

32. The method of claim 23 wherein the optimal signal quality metric is selected such that the correlated power is maximized.

33. The method of claim 23 wherein the optimal signal quality metric is selected such that the plurality of elements cooperate to form a directional receiving antenna for receiving signals sent from an intended transmitter of the wireless communications system and for suppressing the reception of signals received from other than the intended transmitter of the wireless communications system.

34. The method of claim 23 wherein the plurality of elements include first, second, third, and fourth elements positioned at locations corresponding to the corners of a rectangle and a fifth element positioned at a location corresponding to the approximate center of the rectangle.

35. The method of claim 34 including first, second, third, fourth and fifth weight control components for adjusting the weights associated with said first, second, third, fourth and fifth antenna elements, respectively.

36. The method of claim 35 wherein the first, second, third, fourth and fifth weight control components are adjustable to provide a predetermined degree of rejection for signals received by the subscriber unit antenna but not intended for the subscriber unit.

37. The method of claim 23 wherein multiple subscriber units transmit and receive code division multiple access signals on a common carrier frequency in the wireless communications system.

38. The method of claim 37 wherein the code division multiple access signals are transmitted and received within a cell and wherein each cell contains a base station and a plurality of subscriber units, each mobile subscriber unit having an antenna, and wherein each subscriber unit is portable.

39. The method of claim 23 wherein the wireless communications system comprises a system for providing wireless communications among a plurality of subscriber units using spread spectrum signaling for transmission and reception of information signals between a subscriber unit and a base station.

40. The method of claim 23 wherein the process of repeating steps (b) through (e) continues for a predetermined time.

41. The method of claim 40 wherein signals carried over the wireless communications network include forward error correcting capabilities having a predetermined forward error correcting power, and wherein the predetermined time is related to the forward error correcting power.

42. The method of claim 41 wherein the known data period interrupts the communications of information signals on the wireless communications system.

43. The method of claim 42 wherein the predetermined time is selected such that the forward error correcting capabilities can correct errors in the information signal during the period that the information signal is interrupted.

44. The method of claim 40 wherein the subscriber unit further includes at least one control loop, and wherein said at least one control loop can maintain a locked condition for a predetermined time when no information signal is present, and wherein the predetermined time for repeating the steps (b) through (e) is selected to be less than the predetermined time during which said at least one control loop can maintain a locked condition when no information signal is present.

45. The method of claim 23 wherein the process of repeating steps (b) through (e) continues until a signal quality metric has been determined for a predetermined number of directional angles.

46. The method of claim 23 wherein the process of repeating steps (b) through (e) continues until the signal quality metric has been determined for all candidate directional angles.

47. The method of claim 23 wherein the process of repeating steps (b) through (e) continues until a signal quality metric exceeds a predetermined threshold.

48. A method for establishing optimal weights for a plurality of antenna elements of a subscriber unit antenna transmitting and receiving information in a wireless communications system, said method comprising the steps of:
  (a) activating a timer;
  (b) determining when the timer has expired;
  (c) when the timer has expired, terminating the transmitting and receiving of information;
  (d) initiating a standby state;
  (e) applying the weights to a signal received at each of the plurality of antenna elements;
  (f) detecting a received pilot signal at each of the plurality of antenna elements;
  (g) combining the received pilot signal detected at each of the plurality of antenna elements to produce a combined received pilot signal;
  (h) determining a signal quality metric for the combined received pilot signal at the current directional angle of the subscriber unit antenna;
  (i) adjusting the weight control settings of at least one of the plurality of antenna elements to establish a different directional angle for the subscriber unit antenna;
  (j) repeating steps (e) through (i);
  (k) selecting the optimal signal quality metric from among the signal quality metrics determined at the step (h); and
  (l) adjusting the weights for the plurality of antenna elements to achieve the directional angle associated with the selected optimal signal quality metric.

49. The method of claim 48 wherein the weights are returned to the initial values set at the step (e) after a predetermined number of repetitions through the steps (e) through (i).

50. The method of claim 49 wherein the initial values of the weight control settings are stored during the predetermined number of repetitions through the steps (e) through (i).

51. The method of claim 48 wherein the weights are returned to the initial values set at the step (e) after a predetermined time during which the steps (e) through (i) are repeated.

52. The method of claim 48 wherein the initial values of the weight control settings are stored for the predetermined time during which the steps (e) through (i) are repeated.

53. The method of claim 48 wherein the step (k) further comprises the steps:
  (k1) determining the signal quality metrics that exceed a predetermined threshold from among the signal quality metrics associated with the different directional angles of the subscriber unit antenna; and
  (k2) selecting the optimal signal quality metric from among the signal quality metrics selected at the step (k1).

54. The method of claim 48 wherein the step (d) further comprises the steps:
  (d1) terminating the transmission of information signals to and from the subscriber unit;

(d2) initiating a standby state.

55. A method for establishing an optimal directional angle for a subscriber unit antenna in a wireless communication system comprising a base station for communicating over a forward link with the subscriber unit, and wherein the subscriber unit communicates with the base station over a reverse link, said method comprising the steps of:
- (a) receiving known data at the subscriber unit over the forward link;
- (b) determining a signal quality metric for the known data at the current directional data of the subscriber unit antenna;
- (c) changing the directional angle of the subscriber unit antenna;
- (d) repeating the steps (a) through (c);
- (e) selecting the optimum signal quality metric from among the signal quality metrics determined at a step (b) during the repetitions through the steps (a) through (c);
- (f) setting the forward link directional angle of the antenna to the directional angle associated with the signal quality metric selected at the step (e);
- (g) receiving known data at the base station over the reverse link;
- (h) determining a signal quality metric for the known data at the current directional angle of the subscriber unit antenna;
- (i) changing the directional angle of the subscriber unit antenna;
- (j) repeating the steps (g) through (i);
- (k) selecting the optimal forward signal quality metric among the signal quality metrics determined at the step (h) during the repetitions through the steps (g) through (i);
- (l) setting the reverse link directional angle of the antenna to the directional angle associated with the signal quality metric selected at the step (l).

56. The method of claim 55 wherein the step (c) is executed using a predetermined algorithm and wherein the algorithm is known to the base station such that the base station knows the directional angle of the subscriber unit during each of the repetitions through the steps (a) through (c).

57. The method of claim 56 wherein timing at the base station and the subscriber unit is synchronized such that the base station determines when the subscriber unit is executing the repetitions through the steps (a) through (c).

58. The method of claim 56 wherein the base station determines that the subscriber unit is executing step (d) by the reception of a known data pattern on the reverse link.

59. The method of claim 56 wherein the base station does not control the power level of the reverse link signal when the subscriber unit is in the process of repeating the steps (a) through (c).

60. A method for establishing an optimal directional angle for a subscriber unit antenna in a wireless communication system comprising a base station for communicating over a forward link with the subscriber unit, and wherein the subscriber unit communicates with the base station over a reverse link, said method comprising the steps of:
- (a) receiving known data at the subscriber unit over the forward link;
- (b) determining a signal quality metric for the known data at the current directional data of the subscriber unit antenna;
- (c) changing the directional angle of the subscriber unit antenna;
- (d) repeating the steps (a) through (c);
- (e) selecting the optimum signal quality metric from among the signal quality metrics determined at a step (b) during the repetitions through the steps (a) through (c);
- (f) setting the forward link directional angle of the antenna to the directional angle associated with the signal quality metric selected at the step (e).

61. A method for establishing an optimal directional angle for a subscriber unit antenna in a wireless communication system comprising a base station for communicating over a forward link with the subscriber unit, and wherein the subscriber unit communicates with the base station over a reverse link, said method comprising the steps of:
- (a) receiving known data at the base station over the reverse link;
- (b) determining a signal quality metric for the known data at the current directional angle of the subscriber unit antenna;
- (c) changing the directional angle of the subscriber unit antenna;
- (d) repeating the steps (a) through (c);
- (e) selecting the optimal reverse link signal quality metric among the signal quality metrics determined at the step (b) during the repetitions through the steps (a) through (d);
- (f) setting the reverse link directional angle of the antenna to the directional angle associated with the signal quality metric selected at the step (e).

62. An antenna apparatus for use with a receiver in a wireless communications system, said antenna apparatus comprising:
- a plurality of antenna elements;
- a first module for applying weights to the signal received at each of said plurality of elements to establish a directional angle for said antenna apparatus;
- a second module for detecting a received pilot signal at each of said plurality of antenna elements;
- a combiner for combining the received pilot signal detected at each of said plurality of antenna elements to produce a combined received pilot signal;
- a third module for determining a signal quality metric for the combined received pilot signal at each directional angle;
- wherein said first module is responsive to the determined signal quality metrics for adjusting the weights to establish a directional angle for said antenna apparatus that is representative of the optimum signal quality metric.

63. The antenna apparatus of claim 62 wherein the optimal signal quality metric is selected such that the signal power-to-interference ratio is maximized.

64. The antenna apparatus of claim 63 wherein the interference includes thermally generated noise.

65. The antenna apparatus of claim 63 wherein the interference includes interfering emissions received at the subscriber unit antenna from other users of the wireless communications system.

66. The antenna apparatus of claim 63 wherein the interference includes the sum of thermally generated noise and interfering emissions received at the subscriber unit antenna.

67. The antenna apparatus claim 62 wherein the optimal signal quality metric is selected such that the bit error rate is minimized.

68. The antenna apparatus of claim 62 wherein the optimal signal quality metric is selected such that the correlated power is maximized.

69. The antenna apparatus of claim 62 wherein the optimal signal quality metric is selected such that the plurality of elements cooperate to form a directional receiving antenna for receiving signals sent from an intended transmitter and for suppressing the reception of signals received from other than the intended transmitter.

70. The antenna apparatus of claim 62 wherein the plurality of elements include first, second, third, and fourth elements positioned at locations corresponding to the corners of a rectangle and a fifth element positioned at a location corresponding to the approximate center of the rectangle.

71. The antenna apparatus of claim 70 further comprising first, second, third, fourth and fifth weight control components for adjusting the weights associated with said first, second, third, fourth and fifth antenna elements, respectively.

72. The antenna apparatus of claim 71 wherein the first, second, third, fourth and fifth weight control components are adjustable to provide a predetermined degree of rejection for signals received by the receiver but not intended for the receiver.

73. The antenna apparatus of claim 62 wherein the receiver is associated with a subscriber unit operative in a wireless communications network further including a base station for bi-directionally communicating with a plurality of subscriber units using code division multiple access signals on a common carrier frequency.

74. The antenna apparatus of claim 73 wherein the code division multiple access signals are transmitted and received within a cell and wherein each cell contains a base station and a plurality of subscriber units, each subscriber unit having an antenna apparatus, and wherein each subscriber unit is portable.

75. The antenna apparatus of claim 62 wherein the receiver is associated with a subscriber unit operative in a wireless communications network further including a base station for bi-directionally communicating with a plurality of subscriber units using spread spectrum signaling for transmission and reception of information signals between a subscriber unit and a base station.

76. In a wireless communications system, an antenna apparatus for establishing an optimal antenna directional angle at a subscriber unit, said antenna apparatus comprising:
  a plurality of antenna elements:
  a first module for applying a weight to the signal received at each of said plurality of elements;
  a second module for receiving known data at each of the plurality of antenna elements;
  a combiner for combining the received known data to produce a combined known data signal;
  a third module for determining a signal quality metric for the combined known data signal at the current directional angle, wherein the current directional angle is determined by the weight applied to the signal received at each of said plurality of elements;
  a fourth module for controlling said first module to apply different weights to one or more of the signals received at each of said plurality of elements, wherein the third module determines a plurality of signal quality metrics in response to the applied different weights,
  a fifth module for determining an optimum signal quality metric from among the plurality of signal quality metrics;
  wherein said first module is responsive to the determined optimum signal quality metric for applying the weights corresponding to the optimum signal quality metric to establish an antenna directional angle that corresponds to the optimum signal quality metric.

77. The antenna apparatus of claim 76 wherein the optimal signal quality metric is selected such that a signal transmitted from the subscriber unit is formed into a directional beam by the cooperation of the plurality of elements to reduce interfering emissions at other subscriber units of the wireless communications system not intended to receive the transmitted signal.

78. The antenna apparatus of claim 76 wherein the wireless communications network comprises a plurality of subscriber units for communicating bi-directionally with a base station.

79. An antenna for a subscriber unit of a wireless communications system, wherein the wireless communication system further comprises a base station for communicating over a forward link with the subscriber unit, and wherein the subscriber unit communicates with the base station over a reverse link, said antenna comprising:
  at the subscriber unit:
    a plurality of elements;
    a first module for applying weights to the signal received at each of said plurality of elements to establish a directional angle for said antenna;
    a second module for receiving a forward link known signal at each of the plurality of antenna elements;
    a combiner for combining the received known signal at each of said plurality of elements to produce a combined known signal;
    a third module for determining a signal quality metric for the combined known signal at each directional angle;
    wherein said first module is responsive to the determined signal quality metrics for adjusting the weights to establish an optimum forward link directional angle of said antenna; at the base station:
    a first module for receiving a known signal over the reverse link;
    a second module for determining a signal quality metric for the known signal received at the current directional angle of said antenna;
    wherein the directional angle of said antenna is changed;
    a third module for transferring the reverse link signal quality metrics obtained at the base station for each directional angle of said antenna to the subscriber unit; and
  at the subscriber unit a fourth module responsive to the determined reverse link signal quality metrics for setting the reverse link directional angle of said antenna to the directional angle associated with the optimum signal quality metric for the reverse link.

* * * * *

UNITED STATES PATENT AND TRADEMARK OFFICE
CERTIFICATE OF CORRECTION

PATENT NO. : 6,792,290 B2
DATED : September 14, 2004
INVENTOR(S) : Proctor, Jr. et al.

It is certified that error appears in the above-identified patent and that said Letters Patent is hereby corrected as shown below:

Drawings,
Figure 7, delete Figure 7 and insert the new Figure 7:

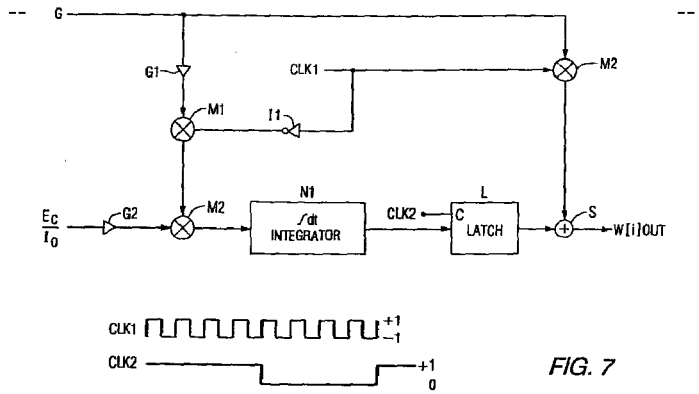

FIG. 7

Column 3,
Line 35, delete "signal a" insert -- signal over a --
Line 49, delete "may be arrive" insert -- may arrive --

Column 4,
Line 37, delete "plurality directions:" insert -- plurality of directions --
Line 48, delete "station," insert -- station. --

Column 8,
Line 66, delete "the establishing the" insert -- estblishing the --

Column 12,
Line 4, delete "to the each" insert -- to each --

Column 18,
Line 8, delete "like a function" insert -- like function --

UNITED STATES PATENT AND TRADEMARK OFFICE
CERTIFICATE OF CORRECTION

PATENT NO. : 6,792,290 B2
DATED : September 14, 2004
INVENTOR(S) : Proctor, Jr. et al.

It is certified that error appears in the above-identified patent and that said Letters Patent is hereby corrected as shown below:

<u>Column 25,</u>
Line 1, delete "apparatus Claim" insert -- apparatus of Claim --

Signed and Sealed this

Third Day of May, 2005

JON W. DUDAS
*Director of the United States Patent and Trademark Office*